United States Patent Office 3,769,404
Patented Oct. 30, 1973

3,769,404
EGG COMPOSITION
S. Duane Latham, St. Louis County, and Robert D. Seeley, Crestwood, Mo., assignors to Anheuser-Busch, Incorporated, St. Louis, Mo.
No Drawing. Filed Oct. 12, 1970, Ser. No. 80,125
Int. Cl. A23l 1/32
U.S. Cl. 426—167                11 Claims

ABSTRACT OF THE DISCLOSURE

The invention comprises a composition for making cooked frozen omelets and other egg products including egg, water, a combination of cellulose gum derivatives, ethoxylated monoglyceride, and a chemical leavening system. Other ingredients include potato flour and non-fat milk solids and citric acid.

BACKGROUND OF THE INVENTION

One of the basic problems with present prepared egg compositions is that omelets made from said products tend to shrink on cooling. Accordingly, it is a principal object of the present invention to provide an egg composition for use in making egg omelets which will rise during cooking and which will not shrink when the omelet is cooled, or stored on a steam table. Omelets made from this composition can be frozen and later reheated without shrinkage. Another principal object of the present invention is to provide a composition which can be used to make a precooked frozen omelet. Heretofore it has not been possible to precook and then freeze an omelet without serious taste, mouth feel, and visual impression problems in the omelet when it is later reheated for consumption.

It is also an object of the present invention to provide an egg composition which will not discolor on standing on a steam table.

Still a further object of the present invention is to provide a composition which can be used in a machine for cooking omelets. The omelet machine and the process of preparing the omelets are more fully described in our copending application entitled, "Omelet Cooking Machine and Process," Ser. No. 79,922, filed Oct. 12, 1970.

A further object of the invention is to provide a composition for making egg-type products, particularly, omelets, which have all of the qualities and characteristics that are desired therein.

SUMMARY OF THE INVENTION

The present invention comprises a composition including egg, water, a chemical leavening agent, and a combination of cellulose gum derivatives, including methyl cellulose and hydroxypropyl cellulose.

DETAILED DESCRIPTION

The egg composition hereinafter described in detail is particularly useful in precooked frozen omelets and the description relates specifically to such use. However, the invention can be utilized in the production of a frozen uncooked batter, or it can be utilized by allowing the chef to mix to ingredients himself.

From about 60 to about 80% whole egg and from about 5 to about 25% added water by weight are used. Whole fresh eggs, frozen egg and reconstituted egg can be used in the composition. The preferred product uses frozen whole egg. In this formulation about 70% whole egg and about 15% added water are used. The additional water is for the purpose of replacing water lost during cooking, thus reducing dryness and improving the eating quality of the product. The eggs are pasteurized to prevent spoilage.

The potato flour and non-fat milk solids are added to improve water holding capacity and to improve eating quality. These additives make the egg feel soft and creamy in the mouth. Up to about 4% potato flour and up to about 3% non-fat milk solids can be used. These percentages are by weight of the final egg composition. In addition to potato flour other suitable carbohydrates, such as, corn starch, rice flour, wheat flour, pregelatinized wheat starch, pregelatized tapioca starch and pregelatinized potato starch can be used in whole or in part as a substitute. Liquid or dried skim milk, liquid or dried whole milk and non-dairy milk substitutes can be substituted for all or part of the non-fat milk solids.

From about 0.05 to about 0.20% citric acid is added to improve cooked egg color. The citric acid brightens the yellow color of egg products and retards ferrous sulfide greening that often occurs when eggs are held at steam table temperature over extended periods. Other edible acids or acid salts, such as malic, fumaric, lactic or monosodium phosphate can be substituted for all or part of the citric acid.

The carboxymethyl cellulose (CMC) is used as a thickening agent in the uncooked omelet batter which aids in suspending added ingredients. Other common thickening agents, such as alginates, carrageening, locust bean, guar and cellulose gums, may be used for this viscosity control.

The other cellulose gum derivatives, namely hydroxypropyl cellulose (Klucel) and methyl cellulose (Methocel) are thermosetting gums. Klucel is a trademark of Hercules Incorporated and Methocel is a trademark of The Dow Chemical Company. Although Methocel HG 90 15,000 and Klucel LF yield the most satisfactory results, other types of Methocel and Klucel may be substituted. These other two gums (Methocel and Klucel) are used to give strength to the coagulated egg protein structure during the cooling process after cooking. This results in an increased stability of omelet shape and volume after removal from the cooking utensil and upon cooling. Omelets cooked without the presence of these cellulose gums shrink very rapidly when cooled, thus lacking volume and eye appeal. When one or more of these gums are removed from the composition, decreased volume of the cooked omelet product results. Thus the combination of gums is important. The reason for this increased volume stability is probably because the cold water soluble cellulose gum derivatives intimately associate with the egg proteins before cooking. During cooking the egg proteins coagulate, and the hydroxypropyl cellulose becomes insoluble and the methyl cellulose gels. The coagulated protein is believed to associate with the insoluble and gelled gums, thus increasing the strength of the protein fiber during the cooling period. When the cooked product is cooled the hydroxypropyl cellulose redissolves and the methyl cellulose gel disassociates. But at the cooled temperature the egg proteins have sufficient strength to maintain the cooked omelet shape and volume. Other compounds having properties similar to hydroxypropyl cellulose and methyl cellulose will function similarly in this composition. Other gum-like materials that do not become insoluble and/or gel at temperatures between 100–200° F. do not act in this composition in the same fashion or achieve the same results as the aforementioned gums. The hydroxypropyl cellulose and methyl cellulose also act to increase the viscosity of the batter. All of the cellulose gums reduce syneresis which often results from freezing and thawing products.

From about 0.10 to about 0.5% hydroxypropyl cellulose and from about 0.05 to about 0.45% by weight methyl cellulose are added to the egg composition. From about 0.07 to about 0.15% carboxymethyl cellulose is added.

These gums are identified as thermosetting and for purposes of this invention thermosetting and heat precipitable gums, i.e., gums which gel or precipitate at about 100–200° F., are satisfactory.

From about 0.03 to about 0.10% by weight ethoxylated monoglyceride (EMG) is added to soften and tenderize the omelet. Higher amounts do not detract from the eating quality of the product but do not improve it measurably. Omelets containing the cellulose gums alone are slightly hard and mealy when compared with those containing the cellulose gums plus EMG. Taste panel results indicate this tenderizing effect is a meaningful improvement. While EMG has been used previously in bakery products, it has not been used in precooked egg products.

The egg omelet formulation uses a chemical leavening system which includes from about 0.40% to about 1.5% sodium bicarbonate and an amount of leavening acid sufficient to neutralize the sodium bicarbonate. Preferably this leavening acid is sodium aluminum phosphate (Levair) which is used on a 1 to 1 weight basis. The chemical leavening system is used to increase the volume of the omelet during the cooking process. The chemical leavening of commercial egg products of this type is new as conventional omelets are whipped into loose volume before cooking. The chemical leavening system adds volume to the omelet mix during cooking and holds this volume on cooling. The increase in volume is about 40–50%.

For best results the chemical leavening should be of the type which gives off some $CO_2$ on mixing of the ingredients, some on standing, and some on heating. This results in a fluffy final cooked omelet. In mixing and cooking the omelet it is important for optimum quality that no more than about 90 minutes elapse between mixing stops and cooking starts. If substantially more time elapses, the action of the chemical leavening will be dissipated before cooking starts and an unsatisfactory omelet may result.

A small but effective amount of salt and pepper is used in the formulation strictly as seasonings.

The formulation as shown in Table 1 may be modified to incorporate various flavoring ingredients or adjuncts to form various flavor varieties. These include meats, cheeses, peppers, mushrooms, and other conventional omelet additives. Up to about 50% flavoring ingredients can be added to the base formulation.

EXAMPLE I

Optimum plain omelet formulation

| Ingredients: | Percent |
|---|---|
| Whole egg | 79.89 |
| Water | 14.82 |
| Potato flour | 1.56 |
| N.F.M.S. | 1.09 |
| Citric acid | 0.05 |
| Carboxymethyl cellulose (CMC) | 0.08 |
| Hydroxypropyl cellulose (Klucel-LF) | 0.15 |
| Methocel 90 HG 15,000 | 0.10 |
| Ethoxylated monoglyceride (EMG) | 0.05 |
| Sodium bicarbonate | 0.75 |
| Sodium aluminum phosphate (Levair) | 0.75 |
| Salt | 0.65 |
| Black pepper | 0.06 |
| | 100.00 |

The foregoing preparation is made as follows: The egg is placed in a Waring blendor or any other suitable mixer along with the added water and dissolved EMG. A small portion of the added water is heated and used to dissolve the EMG. The dry ingredients, except for the leavening system and seasoning are weighed and mixed together. The mixer is started and the speed adjusted to create a vortex. The dry ingredients are slowly sifted into the vortex. A total of about 2 minutes mixing is sufficient. For optimum viscosity development and omelet quality this mixture is held at refrigerated temperature for about 15 to 20 minutes. After this time the leavening and seasoning are added by mixing as described above for the dry ingredients. The resulting omelet batter is again held at refrigerated temperature for 15–20 minutes before cooking the omelets. The leavening and seasoning may be added with the dry ingredients and the hold periods reduced or eliminated, however, optimum quality is not achieved.

The omelets may be cooked by placing a measured quantity of the above omelet batter in a preheated omelet pan and cooked until the egg composition is about one-half coagulated. At this point the omelet may be folded. If flavored omelets are being made, the flavoring ingredients may be added before folding. In some cases, such as with Egg Foo Young omelets, the flavoring ingredients may be mixed with the batter before being deposited in the pan. After folding the cooking is continued until the egg composition is completely coagulated. The omelet may then be consumed or it may be frozen and packaged.

The foregoing egg composition can be cooked by conventional methods or in a mechanical system described in our co-pending application entitled, "Omelet Cooking Machine and Process."

The following are other examples showing variations of formulations from the optimum omelet formulation set forth in Example I.

Example II does not use any potato flour. Example III substitutes pregelatinized tapioca starch for potato flour. Example IV does not use non-fat milk solids. Example V substitutes malic acid for citric acid. Example VI shows a formulation which does not use EMG. In Example VII the water is increased to 20%. In Example VIII the leavening is increased to 1.0% sodium bicarbonate and an equivalent amount of sodium aluminum phosphate. Example IX substitutes skim milk for non-fat milk solids.

All of these formulations produce satisfactory omelet mixes which could be cooked on mechanical equipment as aforesaid.

EXAMPLE II

| Ingredients: | Percent |
|---|---|
| Whole egg | 81.45 |
| Water | 14.82 |
| Potato flour | ---- |
| N.F.M.S. | 1.09 |
| Citric acid | 0.05 |
| CMC | 0.08 |
| Klucel LF | 0.15 |
| Methocel | 0.10 |
| EMG | 0.05 |
| Soda | 0.75 |
| Levair | 0.75 |
| Salt | 0.65 |
| Pepper | 0.06 |

EXAMPLE III

| Ingredients: | Percent |
|---|---|
| Whole egg | 79.89 |
| Water | 14.82 |
| Potato flour | ---- |
| N.F.M.S. | 1.09 |
| Citric acid | 0.05 |
| CMC | 0.08 |

| Klucel LF | 0.15 |
|---|---|
| Methocel | 0.10 |
| EMG | 0.05 |
| Soda | 0.75 |
| Levair | 0.75 |
| Salt | 0.65 |
| Pepper | 0.06 |
| Pregelatinized tapioca starch | 1.56 |

EXAMPLE IV

| Ingredients: | Percent |
|---|---|
| Whole egg | 80.98 |
| Water | 14.82 |
| Potato flour | 1.56 |
| N.F.M.S. | ---- |
| Citric acid | 0.05 |
| CMC | 0.08 |
| Klucel LF | 0.15 |
| Methocel | 0.10 |
| EMG | 0.05 |
| Soda | 0.75 |
| Levair | 0.75 |
| Salt | 0.65 |
| Pepper | 0.06 |

EXAMPLE V

| Ingredients: | Percent |
|---|---|
| Whole egg | 79.89 |
| Water | 14.82 |
| Potato flour | 1.56 |
| N.F.M.S. | 1.09 |
| Citric acid | ---- |
| CMC | 0.08 |
| Klucel LF | 0.15 |
| Methocel | 0.10 |
| EMG | 0.05 |
| Soda | 0.75 |
| Levair | 0.75 |
| Salt | 0.65 |
| Pepper | 0.06 |
| Malic acid | 0.05 |

EXAMPLE VI

| Ingredients: | Percent |
|---|---|
| Whole egg | 79.94 |
| Water | 14.82 |
| Potato flour | 1.56 |
| N.F.M.S. | 1.09 |
| Citric acid | 0.05 |
| CMC | 0.08 |
| Klucel LF | 0.15 |
| Methocel | 0.10 |
| EMG | ---- |
| Soda | 0.75 |
| Levair | 0.75 |
| Salt | 0.65 |
| Pepper | 0.06 |

EXAMPLE VII

| Ingredients: | Percent |
|---|---|
| Whole egg | 74.71 |
| Water | 20.00 |
| Potato flour | 1.56 |
| N.F.M.S. | 1.09 |
| Citric acid | 1.05 |
| CMC | 0.08 |
| Klucel LF | 0.15 |
| Methocel | 0.10 |
| EMG | 0.05 |
| Soda | 0.75 |
| Levair | 0.75 |
| Salt | 0.65 |
| Pepper | 0.06 |

EXAMPLE VIII

| Ingredients: | Percent |
|---|---|
| Whole egg | 80.39 |
| Water | 14.82 |
| Potato flour | 1.56 |
| N.F.M.S. | 1.09 |
| Citric acid | 0.05 |
| CMC | 0.08 |
| Klucel LF | 0.15 |
| Methocel | 0.10 |
| EMG | 0.05 |
| Soda | 1.00 |
| Levair | 1.00 |
| Salt | 0.65 |
| Pepper | 0.06 |

EXAMPLE IX

| Ingredients: | Percent |
|---|---|
| Whole egg | 79.89 |
| Water | 3.02 |
| Potato flour | 1.56 |
| N.F.M.S | ---- |
| Citric acid | 0.05 |
| CMC | 0.08 |
| Klucel LF | 0.15 |
| Methocel | 0.10 |
| EMG | 0.05 |
| Soda | 0.75 |
| Levair | 0.75 |
| Salt | 0.65 |
| Pepper | 0.06 |
| Skim milk | 11.8 |

Thus it is seen that the invention achieves all of the objects and advantages sought therefor.

We claim:
1. An egg composition comprising:
   (a) egg solids,
   (b) water,
   (c) a chemical leavening system comprising sodium bicarbonate and leavening acid, and
   (d) a cellulose gum system comprising a combination of cold water soluble gums, one of which gels and another of which becomes insoluble at 100–200° F., said gels being present in combination in amounts sufficient to give strength to the coagulated egg protein during the cooling process after cooking to maintain the cooked shape and volume, the gel-forming gum being present in amount of about 0.05 to about 0.45% by weight and said gum which becomes insoluble being present in amount of about 0.10 to about 0.5% by weight of the egg composition.

2. The composition of claim 1 wherein the gum which gels is methyl cellulose and the gum which becomes insoluble is hydroxypropyl cellulose.

3. The composition of claim 2 wherein carboxymethyl cellulose is also present in the gum system.

4. The composition of claim 1 wherein said sodium bicarbonate is present in about 0.4 to about 1.5% by weight of the composition and said leavening acid is present in amount sufficient to neutralize the sodium bicarbonate by weight.

5. The composition of claim 4 wherein the leavening acid is sodium aluminum phosphate on about a 1 to 1 weight basis.

6. The composition of claim 1 wherein ethoxylated monoglyceride is also present in the composition.

7. The composition of claim 6 wherein the ethoxylated monoglyceride is present in amount of from about 0.03 to about 0.10% by weight of the composition.

8. The composition of claim 1 wherein potato flour, non-fat milk solids and citric acid are also present in the composition.

9. The composition of claim 8 wherein the potato flour is up to about 4% by weight.

10. The composition of claim 8 wherein the non-fat milk solids is up to about 3% by weight.

11. The composition of claim 8 including 0.05 to 0.20% citric acid.

References Cited

UNITED STATES PATENTS

| | | | |
|---|---|---|---|
| 3,073,704 | 1/1963 | Rivoche | 99—196 |
| 3,565,638 | 2/1971 | Ziegler et al. | 99—196 |
| 3,594,183 | 7/1971 | Melnick et al. | 99—113 |

OTHER REFERENCES

Furia, Handbook of Food Additives, 1968, pp. 338–341, The Chemical Rubber Company, 18901 Cranwood Parkway, Cleveland, Ohio.

Rose et al., Condensed Chemical Dictionary, 1966, pp. 496, 612 and 855, Van Nostrand Reinhold Co., New York, N.Y.

RAYMOND N. JONES, Primary Examiner

R. M. ELLIOTT, Assistant Examiner

U.S. Cl. X.R.

99—114